US011561960B2

(12) United States Patent
Jacinto et al.

(10) Patent No.: US 11,561,960 B2
(45) Date of Patent: Jan. 24, 2023

(54) KEY PERFORMANCE INDICATOR-BASED ANOMALY DETECTION

(71) Applicant: T-Mobile USA, Inc., Bellevue, WA (US)

(72) Inventors: Ariz Jacinto, Bellevue, WA (US); Zunyan Xiong, Bellevue, WA (US); Chuong Phan, Seattle, WA (US); Amer Hamdan, Lynnwood, WA (US); Sangwoo Han, Bellevue, WA (US); Prem Kumar Bodiga, Bellevue, WA (US); Dung Tan Dang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 459 days.

(21) Appl. No.: 16/539,490

(22) Filed: Aug. 13, 2019

(65) Prior Publication Data

US 2021/0049143 A1 Feb. 18, 2021

(51) Int. Cl.
*G06F 16/23* (2019.01)
*G06F 16/22* (2019.01)
*G06F 16/909* (2019.01)
*G06F 16/28* (2019.01)

(52) U.S. Cl.
CPC ...... *G06F 16/2365* (2019.01); *G06F 16/2228* (2019.01)

(58) Field of Classification Search
CPC .............. G06F 16/2365; G06F 16/2228; G06F 16/909; G06F 16/285
See application file for complete search history.

(56) References Cited

U.S. PATENT DOCUMENTS

| | | | |
|---|---|---|---|
| 8,499,066 B1 * | 7/2013 | Zhang | G06F 9/505 709/200 |
| 9,119,086 B1 | 8/2015 | Ouyang et al. | |
| 9,706,515 B1 | 7/2017 | Chadwick | |
| 2015/0131537 A1 | 5/2015 | Chiang et al. | |

(Continued)

OTHER PUBLICATIONS

U.S. Appl. No. 16/539,535, Notice of Allowance dated Jul. 21, 2021, 26 pages.

(Continued)

*Primary Examiner* — Robert W Beausoliel, Jr.
*Assistant Examiner* — Mohammad S Bhuyan
(74) *Attorney, Agent, or Firm* — Han Santos, PLLC

(57) ABSTRACT

An anomaly detection and analysis system detects anomalies in time series data from key performance indicators (KPIs). The system decomposes samples of the time series data received during a first time interval into a trend component, a seasonality component, and a randomness component. The system identifies an upper bound and a lower bound based on the trend component, the seasonality component, and a variance of the randomness component. The system reports a sample received after the first time interval as an anomaly when the sample exceeds the upper bound or the lower bound. The system recalculates the trend component, the seasonality component, and the randomness component when more than a threshold percentage of the samples of the time series data received during a second time interval are reported as being anomalous.

20 Claims, 16 Drawing Sheets

(56) References Cited

U.S. PATENT DOCUMENTS

| | | | |
|---|---|---|---|
| 2015/0148040 A1* | 5/2015 | Ehrlich | H04W 36/00835 |
| | | | 455/436 |
| 2016/0350173 A1* | 12/2016 | Ahad | H04L 41/5003 |
| 2017/0032266 A1 | 2/2017 | Gopalakrishnan et al. | |
| 2017/0078171 A1 | 3/2017 | Tapia et al. | |
| 2017/0200088 A1 | 7/2017 | Yang et al. | |
| 2017/0249649 A1* | 8/2017 | Garvey | G06K 9/628 |
| 2017/0310546 A1 | 10/2017 | Nair et al. | |
| 2018/0220314 A1* | 8/2018 | Chen | H04W 24/04 |
| 2019/0050515 A1* | 2/2019 | Su | G06N 3/0445 |
| 2019/0236177 A1* | 8/2019 | Jain | G06F 16/2365 |
| 2019/0239101 A1 | 8/2019 | Ouyang et al. | |
| 2019/0370610 A1* | 12/2019 | Batoukov | G06N 20/20 |
| 2020/0053108 A1 | 2/2020 | Cili et al. | |
| 2020/0134061 A1 | 4/2020 | Gaber et al. | |
| 2020/0252310 A1 | 8/2020 | Thampy et al. | |
| 2020/0290641 A1 | 9/2020 | Kawakami | |
| 2020/0344252 A1 | 10/2020 | Menon et al. | |
| 2021/0035011 A1* | 2/2021 | Arnold | G06F 11/0721 |

OTHER PUBLICATIONS

U.S. Appl. No. 16/783,006, Notice of Allowance dated Jul. 2, 2021, 31 pages.
U.S. Appl. No. 16/539,535, Final Office Action dated Mar. 23, 2021, 30 pages.
U.S. Appl. No. 16/783,006, Final Office Action dated Mar. 10, 2021, 28 pages.
U.S. Appl. No. 16/539,535, Non-Final Office Action dated Nov. 16, 2020, 23 pages.
U.S. Appl. No. 16/783,006, Non-Final Office Action dated Sep. 23, 2020, 19 pages.
U.S. Appl. No. 16/539,535, Notice of Allowance dated Aug. 18, 2021, 28 pages.

* cited by examiner

| KPI Data | Topic | Vendor | Technology | Granular Level | Scope | Device ID | SW Version |
|---|---|---|---|---|---|---|---|
| KPI 01 | Device DCR | VendorB | VoLTE | National | N/A | 476 | 4 |
| KPI 02 | Device DCR | VendorB | VoLTE | National | N/A | 476 | 5 |
| KPI 03 | Device DCR | VendorB | VoLTE | National | N/A | 476 | 7 |
| KPI 04 | Device DCR | VendorB | VoLTE | National | N/A | 476 | 8 |
| KPI 05 | Device DCR | VendorN | 3G | Market | Nashville | 100 | 5 |
| KPI 06 | Device DCR | VendorN | 3G | Market | Nashville | 100 | 7 |
| KPI 07 | Device DCR | VendorN | 3G | Market | New England | 100 | 5 |
| KPI 08 | Device DCR | VendorN | 3G | Market | New England | 100 | 7 |
| KPI 09 | Device DCR | VendorB | 3G | Manufacturer | Ericsson | 296 | 2 |
| KPI 10 | Device DCR | VendorB | 3G | Manufacturer | Nokia | 296 | 1 |

FIG. 2

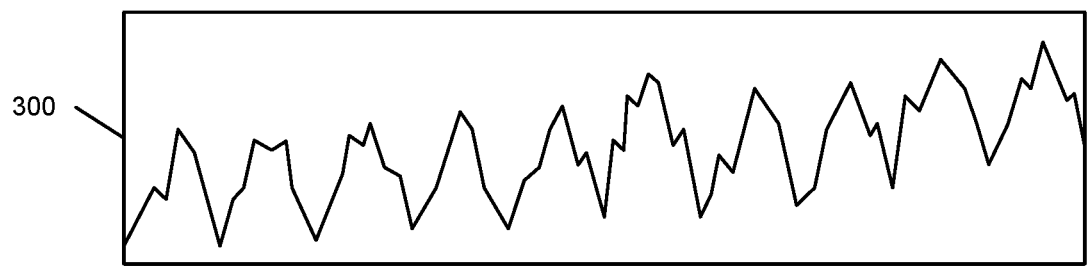
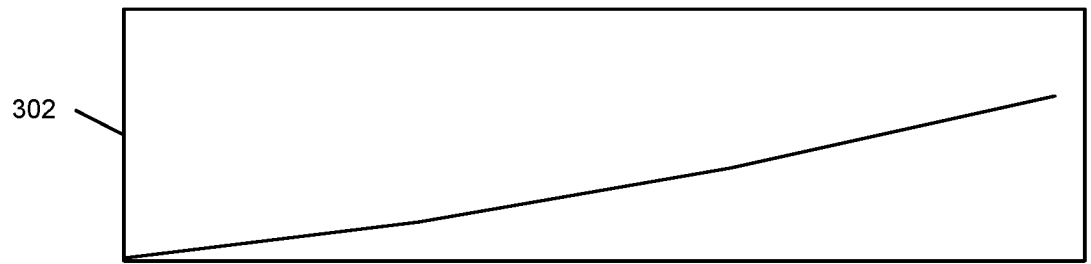
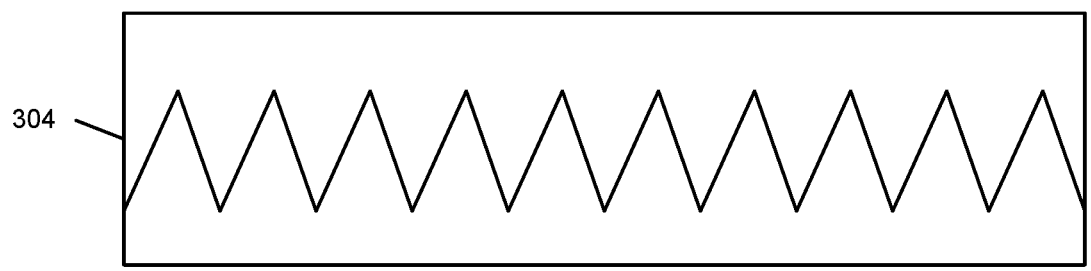
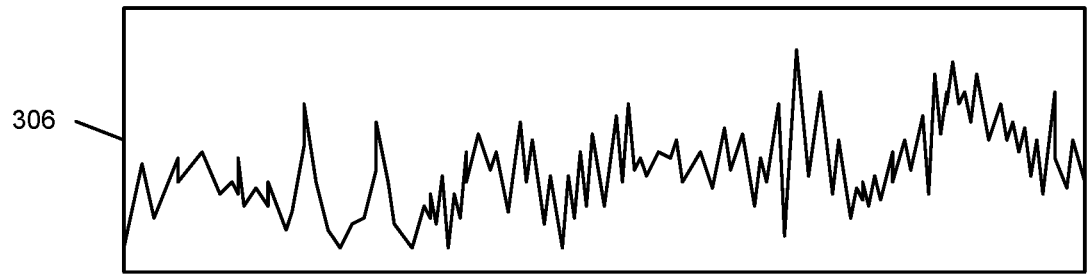
FIG. 3

| Anomaly Topic | Level | Scope | Device ID | SW Version | x8 VoLTE DCR | x4 WiFi DCR | x2 3G DCR | x1 2G DCR | Weighted Score |
|---|---|---|---|---|---|---|---|---|---|
| Device DCR | Market | Albuquerque | 7050 | 8 | 1 | 0 | 1 | 1 | 11 |
| Device DCR | Market | Atlanta | 598 | 25 | 1 | 1 | 1 | 0 | 12 |
| Device DCR | Market | Atlanta | 6377 | 19 | 1 | 1 | 0 | 1 | 15 |
| Device DCR | Market | Austin | 7050 | 8 | 1 | 1 | 0 | 0 | 12 |
| Device DCR | Market | Austin | 7128 | 16 | 1 | 0 | 1 | 1 | 11 |
| Device DCR | Market | Austin | 7445 | 17 | 1 | 1 | 1 | 1 | 15 |
| Device DCR | Market | Birmingham | 6770 | 7 | 1 | 0 | 0 | 1 | 11 |
| Device DCR | Market | Birmingham | 7022 | 1 | 1 | 1 | 1 | 0 | 12 |
| Device DCR | Market | Birmingham | 7126 | 16 | 1 | 1 | 1 | 1 | 15 |
| Device DCR | Market | Central PA | 598 | 26 | 1 | 0 | 1 | 1 | 11 |

| Anomaly Types | | |
|---|---|---|
| no anomaly | 0000 (0) | |
| 2G only | 0001 (1) | |
| 3G only | 0010 (2) | |
| 3G+2G | 0011 (3) | |
| WiFi only | 0100 (4) | WiFi DCR |
| WiFi+2G | 0101 (5) | |
| WiFi+3G | 0110 (6) | |
| WiFi+2G+3G | 0111 (7) | |

| Anomaly Types | | |
|---|---|---|
| VoLTE only | 1000 (8) | VoLTE DCR |
| VoLTE+2G | 1001 (9) | |
| VoLTE+3G | 1010 (10) | Network DCR |
| VoLTE+3G+2G | 1011 (11) | |
| VoLTE+WiFi | 1100 (12) | VoLTE WiFi DCR |
| VoLTE+WiFi+2G | 1101 (13) | |
| VoLTE+WiFi+3G | 1110 (14) | |
| VoLTE+WiFi+3G+2G | 1111 (15) | Overall DCR |

FIG. 10

| | Rk | Device ID | Num of dev | Anomaly Types | Level | Scopes | Anom SV |
|---|---|---|---|---|---|---|---|
| 1201 | 1 | 6562 | 6075 | Overall DCR | Market | Austin, Miami, New Jersey | 9 |
| 1202 | 2 | 7018 | 3795 | Overall DCR | Market | Chicago | 18 |
| 1203 | 3 | 7466 | 2204 | Overall DCR | Market | Denver, St Louis | 17 |
| 1204 | 4 | 6560 | 2141 | Overall DCR | Market | St. Louis, Tempa, Washington | 20 |
| 1205 | 5 | 7466 | 1826 | Overall DCR | Market | Kansas City, Philadelphia, St. Louis | 17 |
| 1206 | 6 | 1425 | 931 | Overall DCR | Market | Kansas City, New Jersey | 07,09 |
| 1207 | 7 | 4126 | 793 | Overall DCR | Market | Dallas | 4 |
| 1208 | 8 | 951 | 368 | Overall DCR | Market | Detroit | 14 |
| 1209 | 9 | 3154 | 150 | Overall DCR | Market | Minneapolis | 2 |
| 1210 | 10 | 2512 | 134 | Overall DCR | Market | St. Louis | 29 |
| 1211 | 11 | 8142 | 98 | Overall DCR | Market | Dallas | 6 |
| 1212 | 12 | 5121 | 71 | Overall DCR | Market | Des Moines | 21 |

FIG. 12

Date: 02/04/2019

Go to Table: National Overall DCR

Summary

| KPI name | National | Num Markets |
|---|---|---|
| DCR VoLTE | Anomaly | 10 Markets |
| DCR 2G | No Anomaly | No Anomaly |
| DCR WiFi | Anomaly | 9 Markets |
| DCR 3G | No Anomaly | 7 Markets |

National Overall DCR

| Rk | Device ID | Num Dev | Take Rate | Unique Devices | Markets | SW Version |
|---|---|---|---|---|---|---|
| 1 | 1051 | 255,387 | 13.41% | 1,904,910 | National | 13 |
| 2 | 7192 | 76,569 | 35.11% | 218,100 | National | 16 |
| 3 | 6013 | 45,051 | 16.01% | 281,398 | National | 9 |
| 4 | 4912 | 13,998 | 48.78% | 28,698 | National | 17 |
| 5 | 5101 | 8,010 | 6.33% | 126,590 | National | 11 |
| 6 | 2512 | 6,122 | 12.85% | 47,625 | National | 25 |

Market Overall DCR

| Rk | Device ID | Num of dev | Take Rate | Unique Devices | Scopes | SW Version |
|---|---|---|---|---|---|---|
| 1 | 7018 | 3781 | 0.66% | 571,932 | Chicago | 9 |
| 2 | 7466 | 2653 | 0.14% | 1,905,156 | Denver | 18 |
| 3 | 6562 | 1404 | 0.47% | 301,645 | New Jersey | 17 |
| 4 | 4126 | 918 | 1.43% | 64,320 | Dallas | 20 |
| 5 | 6560 | 872 | 0.29% | 304,006 | St Louis | 17 |
| 6 | 6562 | 544 | 0.02% | 2,550,247 | Miami | 07,09 |

Market Network DCR

| Rk | Device ID | Num of dev | Take Rate | Unique Devices | Scopes | SW Version |
|---|---|---|---|---|---|---|
| 1 | 7018 | 26,513 | 1.39% | 1,904,910 | 4 Markets | 13 |
| 2 | 6562 | 25,851 | 1.01% | 2,550,247 | 2 Markets | 25,06 |
| 3 | 7466 | 17,728 | 1.03% | 1,714,667 | 4 Markets | 04,06 |

FIG. 13

KEY PERFORMANCE INDICATOR-BASED ANOMALY DETECTION

BACKGROUND

A performance indicator or key performance indicator (KPI) is a type of performance measurement. KPIs evaluate the degree of success of an organization or of particular activities (such as projects, programs, products and other initiatives) in which the organization engages. The organization may choose the KPIs based on what is important to the organization, e.g., based on the present state of the business and its key activities.

A communications service provider such as an Internet service provider or a mobile network operator may monitor a vast array of provider equipment and user equipment for KPIs. Analysis of the KPIs may yield useful insight for the service provider as well as for businesses that are subscribers of the service. To perform the analysis, an administrator may create dashboards or spreadsheets to study the data trends and seasonality. However, the amount of data available for KPIs in these instances may be vast, so the analysis of the KPI data can be very tedious and time consuming.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 2 illustrates classification of KPI data according to the features of the KPIs or the sources of the KPI data.

FIG. 3 illustrates the decomposition of KPI time series data into trend, seasonality, and randomness components.

FIG. 10 illustrates ranking scores that quantify the severity or relevance of the anomalies using weighting and binary value conversion techniques.

FIG. 12 illustrates the anomaly analyzer, ranking anomaly items based on the number of customers impacted.

FIG. 13 illustrates a GUI of the anomaly analyzer that facilitates the detection and analysis of anomalies based on continuously collected KPIs.

DETAILED DESCRIPTION

This disclosure is directed to anomaly detection and analysis techniques that facilitate the detection and analysis of anomalies based on continuously collected key performance indicators (KPIs). In some embodiments, a system receives KPI data and stores the received KPI data in a database. The system includes an anomaly detector, which processes time series data in the database to detect anomalies. The content of the database, including the detected anomalies, are exposed to web-based applications through application programming interface (API). The web-based application provides visualization of the KPI data and the detected anomalies. The web-based application also analyzes the detected anomalies and provide summaries of the analysis.

Figure 1:
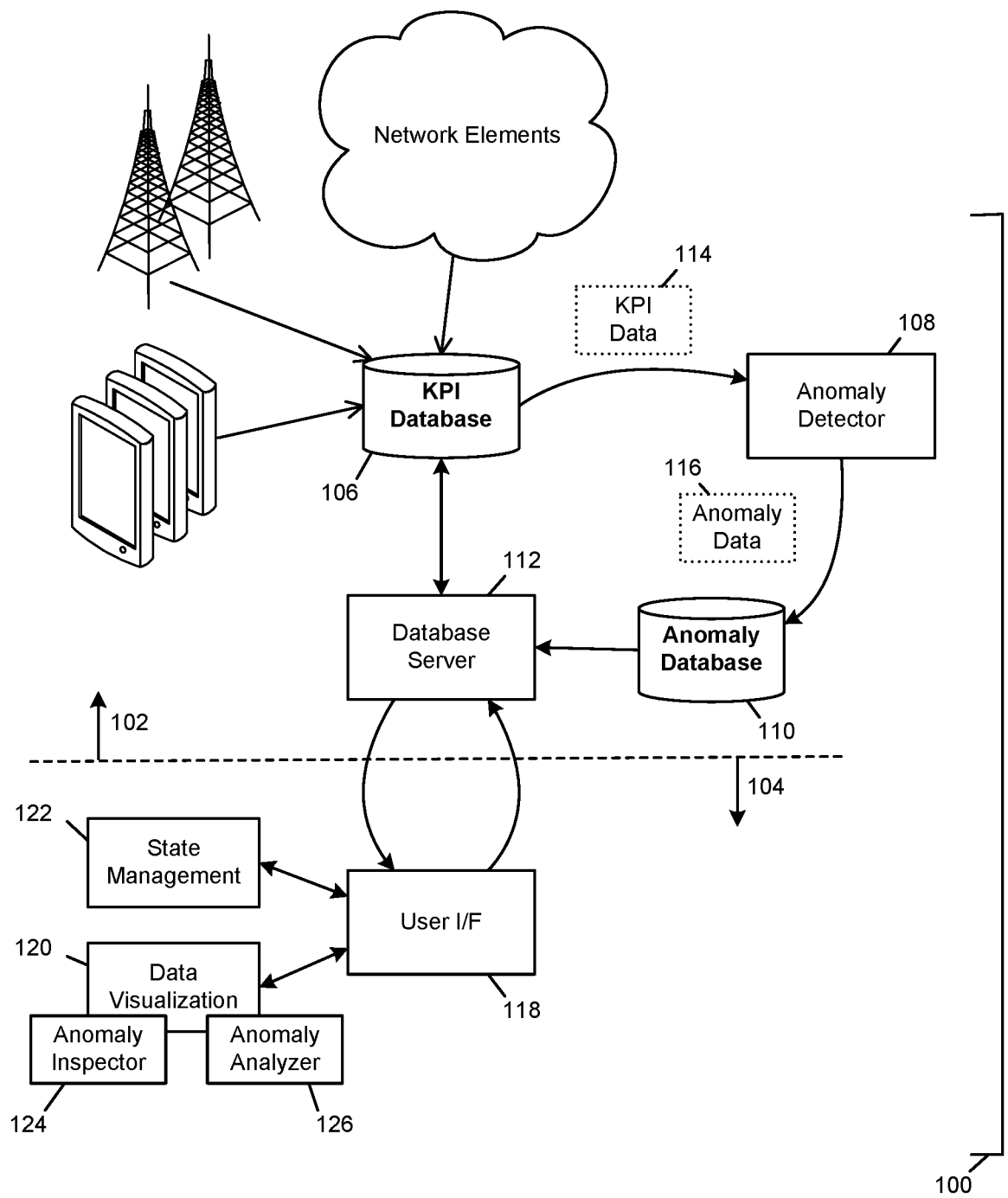
FIG. 1 conceptually illustrates an anomaly detection and analysis system, consistent with an exemplary embodiment.

FIG. 1 conceptually illustrates an anomaly detection and analysis system 100 consistent with an exemplary embodiment. The anomaly detection analysis system is implemented as a web-based service provided by a server device 102 to a client device 104. Each of the server device 102 and the client device 104 may be a desktop computer, a laptop computer, tablet computer, a smartphone, a smartwatch, a personal digital assistant (PDA), or any other computing device or mobile device that is capable of communicating with other devices via a network.

The server device 102 provides a KPI database 106, an anomaly detector 108, an anomaly database 110, and a database server 112. The KPI database 106 may receive KPI data 114 from user equipment, base stations, various network elements, business information servers, etc. The received KPI data 114 is stored in the KPI database 106. The anomaly detector 108 processes the KPI data in the KPI database 106 to detect anomalies. Anomaly detection is described in Section I below. The KPI data 114 and the detected anomalies (or anomaly data 116) are exposed to the client device 104 (and other client devices) through a database server 112.

In some embodiments, the KPI data in the KPI database 106 are normalized to time series format and stored in hive tables. The normalized time series data is processed by the anomaly detector 108. The output of the anomaly detection operation, i.e., the anomaly data 116, is stored in the anomaly database 110, which may be a NoSQL (not only structured query language) database. In some embodiments, the anomaly database 110 is implemented as part of the KPI database 106.

The client device 104 may operate a web-based application that accesses the content of the KPI database 106 and the anomaly database 110 by communicating with the database server 112 in the server device 102. In some embodiments, the server device 102 is configured to communicate with one or more client devices (including the client device 104) running RESTful APIs.

The client device 104 (or the web-based application) is a user device that provides a user interface 118, a data visualization function 120, and a state management function 122. The data visualization function 120 visualizes the content of the KPI database 106. The data visualization function 120 includes an anomaly inspector 124 that allows visual inspection of KPI data and anomalies at different granular levels and at different observation entities. Section II below describes an example anomaly inspector. The data visualization function 120 also includes an anomaly analyzer 126 that analyzes the detected anomalies and visually presents summaries of the analysis by e.g., ranking different types of anomalies. Section III below describes an example anomaly analyzer.

In some embodiments, the web application running on the client device 104 is a React web application. Specifically, the user interface 118 is a dynamic user interface that is built by using the React JavaScript library, also known as ReactJS. However, the user interface 118 may be developed using other scripting language and/or libraries in other embodiments. The state management function 122 is implemented by a Redux state container for JavaScript application to manage state changes. The state of the web application is represented by a single object, which is mutated by reducers functions. The data visualization function 120 is implemented by a Data Driven Document JavaScript library (D3.js) for creating dynamic and interactive data visualizations, in which web-based documents are rendered by browsers in Scalable Vector Graphics (SVG). In some embodiments, the anomaly data 116 and/or other content of the KPI database 106 is exposed as a Representational State Transfer (REST) service by the server device 102, from which the React web application running on the client device 104 communicates with the database server 112 to retrieve the anomaly data and displays it in the form of D3 charts.

In some embodiments, KPI data may be classified based on features that characterize the KPIs or the sources of the KPI data. The features may include market area (e.g., geographical location), vendor, technology, device types, software version, etc. KPI data may also be classified based on the topic of the data that is being reported in the KPIs, such as drop call rate (DCR) of the device. The features of KPIs may associate the corresponding KPI data with one or more observed entities such as market, vendor, technology, device types, software version, etc. In some embodiments, the KPI data stored in the KPI database 106 and the anomaly data stored in the anomaly database 110 may be classified or identified based on these features. A set of KPI data (e.g., a series of numbers in time series format) collected from KPIs of a particular source and analyzed as a unit or item is referred to as a KPI item. In some embodiments, a KPI item (or a set of KPI data) has a set of metadata for associating the set of KPI data with one or more observed entities or features.

FIG. 2 illustrates classification of KPI data according to the features of the KPIs or the sources of the KPI data. The figure illustrates a table 200 that lists several KPI items 201-210 (KPI 01 through KPI 10). Each KPI item has a set of features that fall into categories such as "topic", "vendor", "technology", "granular level", "scope", "device ID", and "software (SW) version". Each KPI item is loaded into the anomaly detection and analysis system 100 for detecting anomalies. The anomalies detected from a KPI item are associated with the KPI item and can be classified based on the features of the KPI item.

I. Anomaly Detection

Some embodiments of the disclosure provide a method for detecting anomalies in time series data. In such embodiments, the anomaly detection method is performed by the anomaly detector 108, which receives samples of KPI data in time series format from the KPI database 106. The anomaly detector 108 decomposes the samples of the KPI data in a first time interval into a trend component, a seasonality component, and a random component. The anomaly detector 108 computes a variance of the random component. The anomaly detector 108 identifies an upper bound and a lower bound based on the trend component, the seasonality component, and the variance of the random component. The anomaly detector 108 reports a sample received after the first time interval as an anomaly when the sample exceeds the identified upper bound or lower bound. The anomaly detector 108 recalculates the trend component, the seasonality component, and the random component when more than a threshold percentage of the samples received during a second time interval are reported as being anomalous.

FIG. 3 illustrates the decomposition of KPI time series data 300 into trend, seasonality, and randomness components. The time series data 300 are samples of KPIs from a KPI source (e.g., a device or a group of devices sharing a set of common features). In other words, the time series data 300 is KPI data that is processed as one KPI item. The time series data 300 is decomposed into a trend component 302, a seasonality component 304, and a random component 306. The trend component 302 reflects a long-term progression of the KPI. The seasonal component 304 reflects seasonality or cyclical influence on the KPI. The random component 306, or noise components, reflects random, irregular influences on the KPI.

For example, in some embodiments, the anomaly detector collects historical time series data Y for at least two weeks and at most 8 weeks long (so the range of historical data is from 14 days to 56 days), i.e., $Y=[Y_0, \ldots, Y_{N-1}]$, where $N \in [14, 56]$. The time series data Y is decomposed into three components T, S, R, i.e., $Y=T+S+R$, wherein T represents the trend component, S represents the seasonality component, and R represents the random component.

For the trend component T, the anomaly detector may use polynomial regression to estimate the trend of the historical time series data:

$$T_t = \beta_0 + \beta_1 x_t + \beta_2 x_t^2 + \varepsilon$$

where $T_t$ is the trend at time t of the historical time series data. The trend $T_t$ at a new date N (or the N+1-th day) is $T_N$, which can be used to predict the KPI time series data value $Y_N$ at the new date N:

$$Y_N \sim T_N = \beta_0 + \beta_1 x_N + \beta_2 x_N^2$$

For the seasonality component S, the anomaly detector may apply a band-pass filter to the time series data to determine the seasonality of the historical data and to predict the seasonality value of a new date. If the seasonality is determined to have a cycle or period of one week (7 days), then $S \in [S_0, S_1, S_2, S_3, S_4, S_5, S_6]$, and the seasonality value for a new date N (or the N+1-th day) is $S_N = S_{N \% 7}$.

The anomaly detector 108 calculates the mean $\bar{R}$ and the standard deviation $R_{std}$ of the random component to determine the variance of the random component. The variance of the random component is expressed by an upper bound $V_{upper}$ and a lower bound $V_{lower}$ based on a predefined threshold $C_{threshold}$. Specifically:

$$R = [R_0, \ldots, R_{N-1}], N \in [14, 56]$$

-continued $$\overline{R} = \frac{\sum_{t=0}^{N-1} R_t}{N},$$

$$R_{std} = \sqrt{\frac{1}{N}\sum_{t=0}^{N-1}(R_i - \overline{R})}$$

$$V_{upper} = \overline{R} + C_{threshold} \times R_{std}$$

$$V_{lower} = \overline{R} - C_{threshold} \times R_{std}$$

In some embodiments, $C_{threshold}$ is a constant value 2.5, such that $V_{upper}$ and $V_{lower}$ of the variance defines a gap that is ±2.5 standard deviation of the random. The larger the variance of the historical data, the wider the gap between the upper and lower boundaries, vice versa. To determine whether KPI data sample $Y_N$ for a new date N is an anomaly, the variance of the random component is used to determine anomaly detection boundary, which is defined by an upper bound $B_{upper}$ and a lower bound $B_{lower}$, specifically:

$$B_{upper} = T_N + S_N + V_{upper}$$

$$B_{lower} = T_N + S_N + V_{lower}$$

$T_N$ is the trend value at the new date N and $S_N$ is the seasonality sample at the new date N. If $B_{lower} \leq Y_N \leq B_{upper}$, $Y_N$ is marked as normal. Otherwise, $Y_N$ is marked as an anomaly. For example, when $C_{threshold}$ is defined to be constant value 2.5, $Y_N$ is identified as an anomaly if the value of $Y_N$ is beyond ±2.5 standard deviation of $T_N + S_N$.

Figure 4:
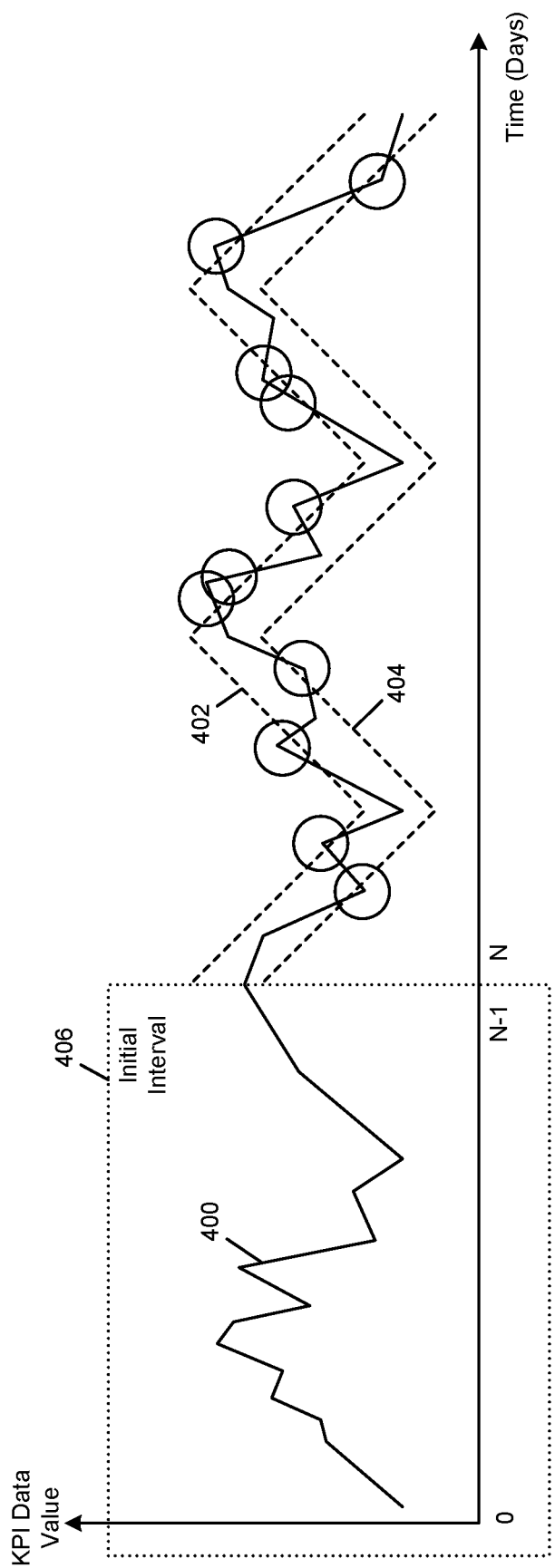
FIG. 4 illustrates detecting anomalies in KPI time series data by the anomaly detector.

FIG. 4 illustrates detecting anomalies in KPI time series data by the anomaly detector. The figure illustrates samples of a time series data 400 that are collected over a period of time from KPIs. The anomaly detector decomposes the time series data 400 into trend, seasonality, and random components. The random component of the time series data 400 is used to determine a variance. Based on the variance, the seasonality, and the trend, the anomaly detector determines the anomaly detection bounds, including an upper bound $B_{upper}$ 402 and a lower bound $B_{lower}$ 404. The anomaly detector 108 reports an anomaly (illustrated by circles) whenever the value of the time series data 400 is higher than $B_{upper}$ 402 or lower than $B_{lower}$ 404. In some embodiments, the anomaly detector 108 may receive an annotation of a particular sample such that the particular sample would not be labeled or considered as an anomaly even if the sample exceeds $B_{upper}$ and $B_{lower}$.

In some embodiments, the anomaly detector uses historical data of an initial interval 406 to establish the trend, the seasonality, and the variance (and therefore $B_{upper}$ and $B_{lower}$). During the initial interval 406, the anomaly detector does not report anomaly since $B_{upper}$ and $B_{lower}$ are not established yet. After the initial interval 406, the anomaly detector reports or marks an anomaly (illustrated by a circle) whenever a sample of the KPI time series data 400 exceeds $B_{upper}$ 402 or $B_{lower}$ 404. In some embodiments, the initial interval 406 is chosen to be at least 60 days based on experimental results.

In some embodiments, whenever more than 80% of the samples of the KPI time series data within a given timing window (e.g., two weeks) are marked as anomalous (e.g., more than 11 anomalous days out of two weeks), the anomaly detector recalculates or updates the trend and the seasonality components based on the samples of the given timing window. This reflects an assumption that, when most samples of a given period are marked as abnormal, it is an indication that the trend and seasonality components of the data have changed. When seasonality and trend components are updated, the anomaly detection bounds $B_{upper}$ and $B_{lower}$ are also updated.

Figure 5:
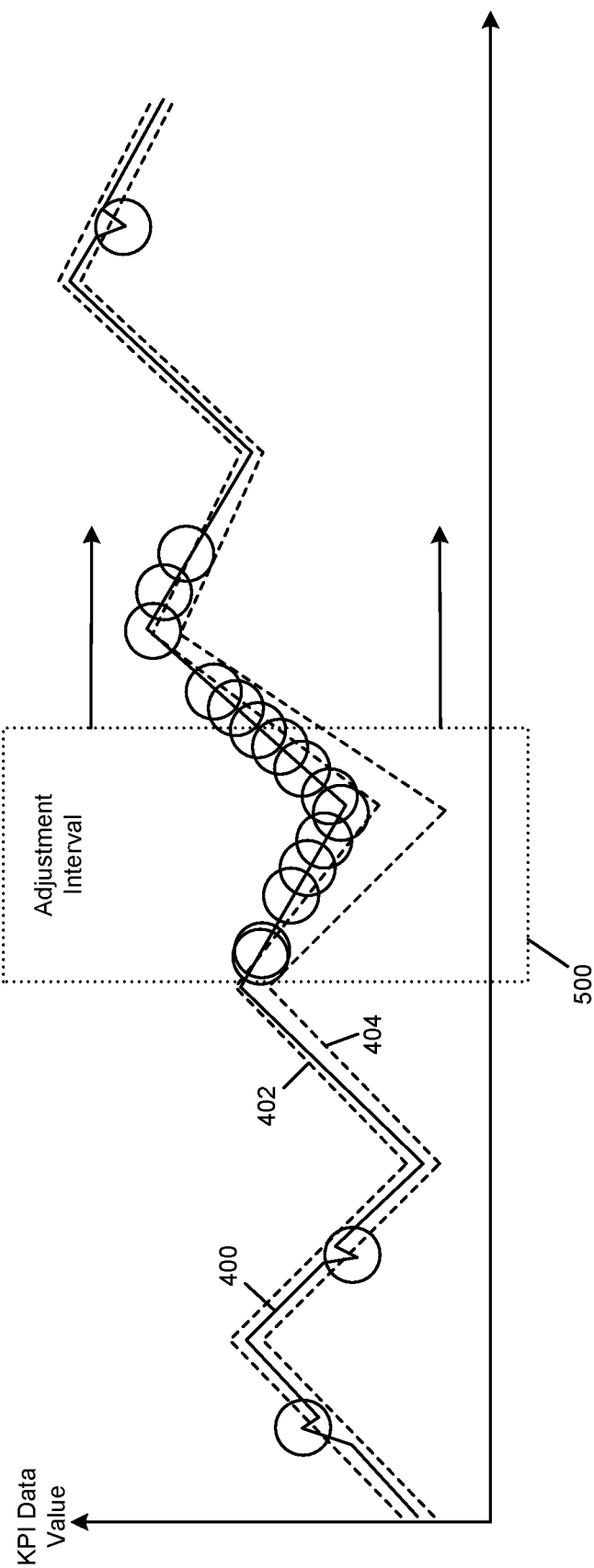
FIG. 5 illustrates the updating of the anomaly detection bounds when more than a threshold percentage of KPI samples within a timing window are anomalous.

FIG. 5 illustrates the updating of the anomaly detection bounds when more than a threshold percentage of KPI samples within a timing window are anomalous. The figure illustrates the KPI time series data 400 along with the anomaly detection bounds $B_{upper}$ 402 and $B_{lower}$ 404 sometimes after the initial interval 406. In other words, the trend and the seasonality of the KPI time series data 400 have already been established.

The anomaly detector 108 continuously monitors the samples of the KPI time series to see if the seasonality and the trend components of the KPI time series data have changed. Specifically, the anomaly detector uses a sliding window to see if more than a threshold percentage of the samples in the sliding window are reported as being anomalous. In the example illustrated in FIG. 5, more than 80% of the samples in an adjustment interval 500 are beyond the anomaly detection bounds $B_{upper}$ 402 and $B_{lower}$ 404 and are reported as being anomalous. The higher than a threshold percentage of anomalies triggers the anomaly detector 108 to recalculate the trend and the seasonality of the KPI time series data 400 based on the more recent samples of the KPI time series data 400.

Figure 6:
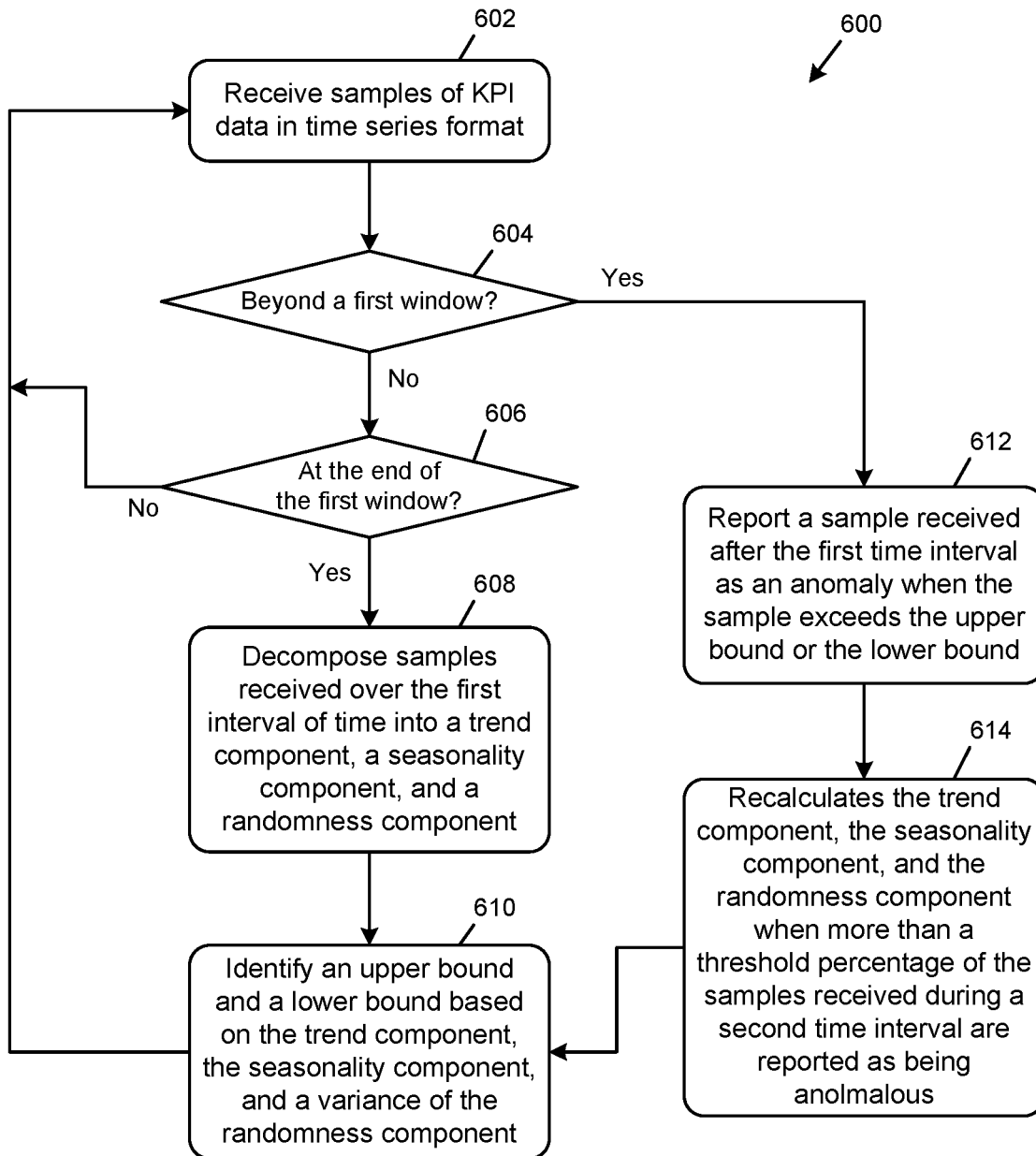
FIG. 6 conceptually illustrates a flow diagram of an example process for detecting anomalies in KPI time series data.

FIG. 6 conceptually illustrates a flow diagram of an example process 600 for detecting anomalies in KPI time series data. In some embodiments, the process 600 is performed by the anomaly detector 108 implemented by the server device 102. The process 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 602, the anomaly detector 108 receives samples of KPI data in time series format from a database (e.g., KPI database 106) for a KPI item. At block 604, the anomaly detector 108 determines whether the received sample is beyond a first timing window. The first timing window is an initial timing window (e.g., the initial interval 406 of FIG. 4) within which the samples of KPI data are used to establish the trend, the seasonality, and the variance of the random component. If the received sample is beyond the first timing window, the process 600 proceeds to block 612 to identify anomalous samples based on the established trend, seasonality, and variance of the random component. If the received sample is not beyond the first timing window, the process proceeds to 606.

At block 606, the anomaly detector 108 determines whether the received sample is at the end of the first timing window. If so, the process proceeds to block 608 to decompose the KPI data and to determine upper and lower bounds for detecting anomalies. Otherwise, the process returns to block 602 to receive additional samples of KPI data.

At block 608, the anomaly detector 108 decomposes the samples of the KPI data in a first interval of time into a trend component, a seasonality component, and a random component. At block 610, the anomaly detector 108 identifies an upper bound and a lower bound based on the trend component, the seasonality component, and a variance of the random component. In some embodiments, the upper bound and the lower bound are identified based on ±2.5 standard deviation of the random component from a sum of the trend component and the seasonality component. The process then returns to 602 to receive further samples of the KPI data in time series format.

At block 612, the anomaly detector 108 reports a sample received after the first time interval as an anomaly when the sample exceeds the upper bound or the lower bound. In some embodiments, the anomaly detector reports an anomaly by marking the corresponding sample in the KPI database as being anomalous. In some embodiments, an annotation may prevent a particular sample from being labeled or considered an anomalous sample even if the sample exceeds the upper bound or the lower bound.

At block 614, the anomaly detector 108 recalculates the trend component, the seasonality component, and the random component when more than a threshold percentage of the samples received during a second time interval are reported as being anomalous. An example of the second time interval is the adjustment interval 500 of FIG. 5. The process then proceeds to block 610 to update (or re-identify) the upper bound and the lower bound based on the recalculated trend, seasonality, and random component.

II. Anomaly Inspector

The anomaly detection and analysis system 100 includes an anomaly inspection service implemented by the anomaly inspector 124 that allows visual inspection of KPI data and anomalies at different granular levels and at different observation entities. The anomaly inspector 124 facilitates the study of service quality data trends by monitoring millions of KPI combinations and generates alerts for trend changes in the quality of telecommunication services received by e.g., subscribers of a cellular network.

The anomaly inspector 124 facilitates visualization and analysis of the monitored KPIs and the detected anomalies at various observed entities at different granular levels. These observed entities may correspond to different market areas (e.g., geographical locations), different user device software versions, different user device manufacturers, different user device types, etc. In some embodiments, the anomaly inspector 124 constructs a hierarchical tree, whose nodes correspond to observed entities at different granular levels. Each node is associated with KPIs that are monitored for a corresponding observed entity.

To make the visualization of the massive amount of data more manageable, the anomaly inspector 124 displays only a portion of the hierarchical tree and retrieves only the corresponding KPI data of the portion from a database for analysis. This selective retrieval of KPI data for analysis reduces computation overhead. Further, the anomaly inspector 124 may display only a first node while offspring nodes of the first node remain hidden until the first node is selected for expansion. The anomaly inspector 124 may also hide the KPI time series data and the anomaly data until the first node is selected for inspection. Such selective display declutters the data being presented.

Accordingly, the construction of a hierarchical tree with selectable nodes and the selective display of only portions of the hierarchical tree allows anomalies to be analyzed and displayed compactly, so that a user can clearly understand what is being displayed and quickly identify the anomalies.

Figure 7:
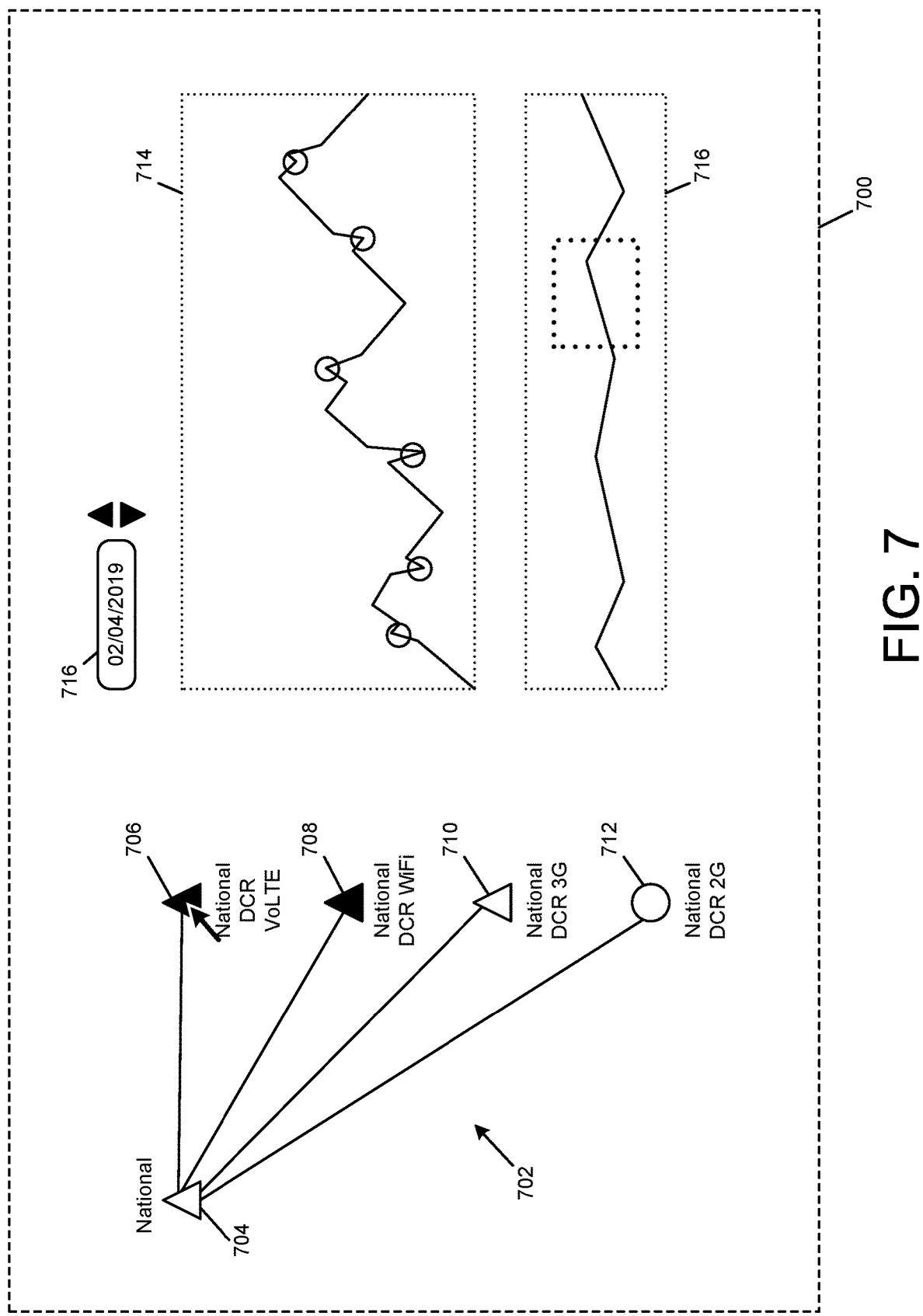
FIG. 7 illustrates a Graphical User Interface (GUI) of the anomaly inspector, which shows a hierarchical tree that includes selectable nodes that correspond to observable entities.

FIG. 7 illustrates a GUI 700 of the anomaly inspector 124 that shows a hierarchical tree 702 that includes selectable nodes that correspond to observable entities. The GUI 700 may be provided by the user interface 118. When a node in the hierarchical tree is selected, the KPI data associated with the observable entity of the node is displayed by the GUI 700. A portion of the hierarchical tree 702 is displayed. The displayed portion of the hierarchical tree includes nodes 704, 706, 708, 710, and 712. In some embodiments, the anomaly inspector 124 retrieves only KPI data relevant to the displayed nodes of the hierarchical tree 702. Data specific to nodes that are not revealed are not retrieved by the anomaly inspector 124.

As illustrated in FIG. 7, the node 706 is selected (indicated by a cursor). The GUI also includes windows 714 and 716, which display the KPI data and anomaly data of the selected node 706. The GUI also includes a date specification element 718, which allows the user of the anomaly inspector 124 to specify a particular date or a range of dates to be displayed in the windows 714 and 716.

In some embodiments, each node has an anomaly indicator showing whether anomalies are detected at the observed entity of the node. Such an anomaly indicator may be implemented as a node with a particular shape, and/or a particular color. In the example of FIG. 7, a node shaped as a circle (e.g., node 712) indicates an observed entity having no detected anomalies. A node shaped as a solid triangle (e.g., nodes 706 and 708) indicates an observed entity having detected anomalies at the current granular level of the node. A node shaped as a hollow triangle (e.g., nodes 704 and 712) indicates an observed entity having detected anomalies at lower granular levels but not the level of the observed entity itself (i.e., at offspring nodes of the current node but not the current node itself). Such anomaly indicators allow the user to quickly locate the anomalous occurrences without having to view the entire hierarchical tree 702 or to retrieve data for displaying the entire hierarchical tree 702.

As mentioned, nodes of the hierarchical tree 702 correspond to observable entities at different granular levels. These observed entities may correspond to different market areas (or geographical locations), different user device software versions, different user device manufacturers, different user device types, different wireless technologies, etc. In the example of FIG. 7, the observed entity for the node 704 is the entire national market, the observed entity for the node 706 is VoLTE technology national level DCR, the observed entity for the node 708 is Wi-Fi technology national level DCR, the observed entity for the node 710 is 3G technology national level DCR, the observed entity for the node 712 is 2G technology national level DCR, etc. In addition, the nodes 706, 708, 710, and 712 are child nodes of the node 704. Indicating that the national level DCRs for VoLTE, Wi-Fi, 3G, and 2G are encompassed by the national market.

Figure 8:
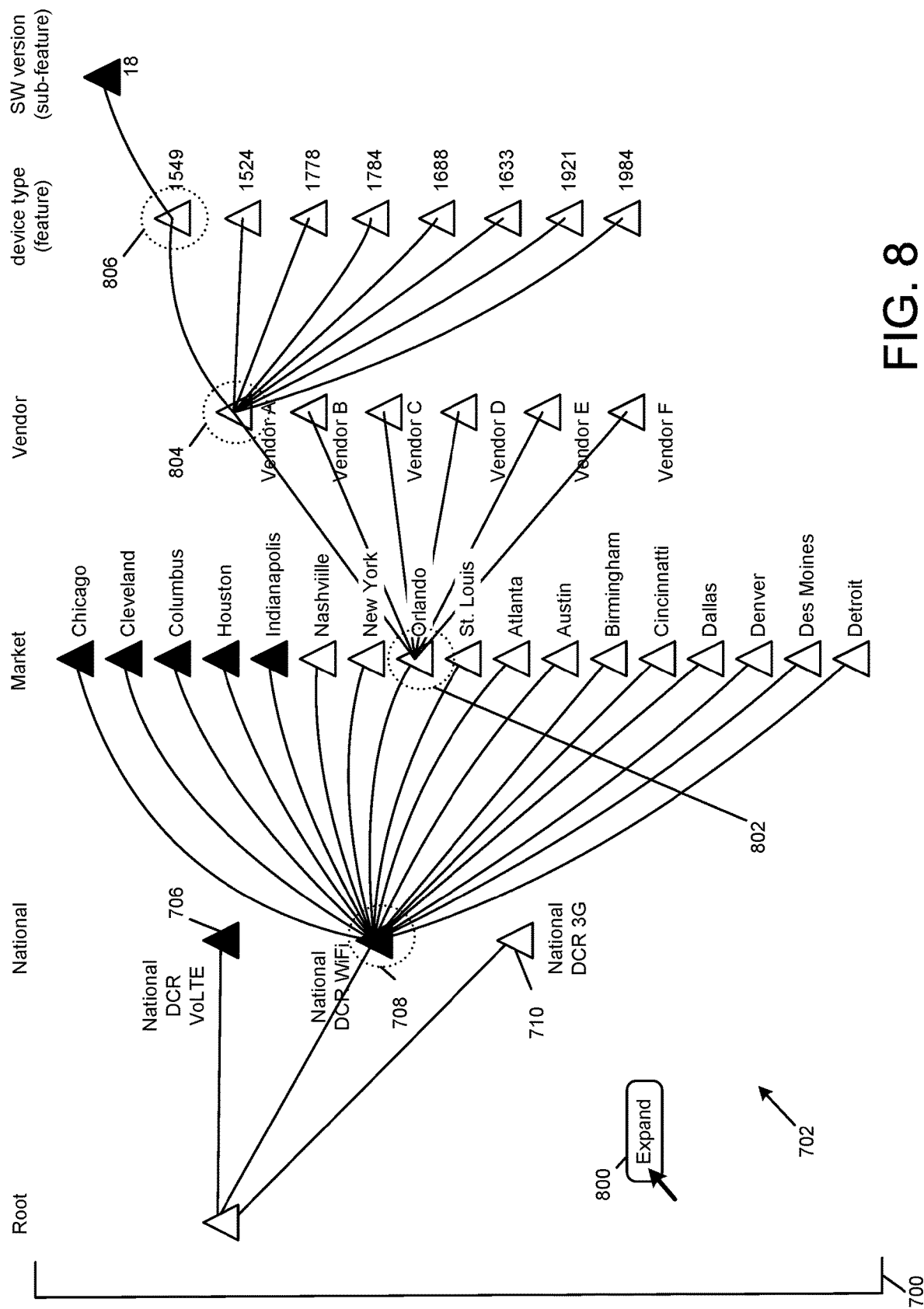
FIG. 8 illustrates an expanded view of the hierarchical tree to display more nodes that correspond to more observed entities at more granular levels.

In some embodiments, the anomaly inspector 124 may reveal more nodes of the hierarchical tree (or expand the displayed portion of the tree) if prompted by the user. FIG. 8 illustrates an expanded view of the hierarchical tree to display more nodes that correspond to more observed entities at more granular levels.

For example, the GUI 700 includes an expansion element 800 that may be applied to reveal additional granular levels of observed entities beneath an observed entity. In the example of FIG. 8, the node 708 is first selected, and the expansion element is used to expand the hierarchical tree 702 to reveal child nodes of the node 708 in "market" level. A node 802 in the "market level" is then selected, and the expansion element 800 is used to reveal child nodes of the node 802 in the "vendor" level. A node 804 in the "vendor" level is then selected, and the expansion element 800 is used to reveal child nodes of the node 804 in the "device type" level. A node 806 in the "device type" level is then selected, and the expansion element 800 is used to reveal child nodes of the node 806 in the "software version" level.

In the example, the node 806 corresponds to KPIs and anomaly data based on DCR data collected from devices of device type "1549" running software version "18" of vendor A in Orlando market using Wi-Fi technology. Likewise, node 802 corresponds to KPIs and anomaly data based on DCR data collected from all devices in Orlando market using Wi-Fi technology, regardless of vendor, device type, and software version.

In some embodiments, nodes that correspond to observed entities that do not have detected anomalies are hidden from view, and their corresponding data are not retrieved. This reduces visual clutter, as well as helps to minimize the amount of KPI data and anomaly data that has to be retrieved from the KPI database 106 and the anomaly database 110. In the example of FIG. 8, nodes that correspond to observed entities that do not have detected anomalies are hidden (e.g., the node 712 shown in FIG. 7 is hidden from view in FIG. 8).

Figure 9:
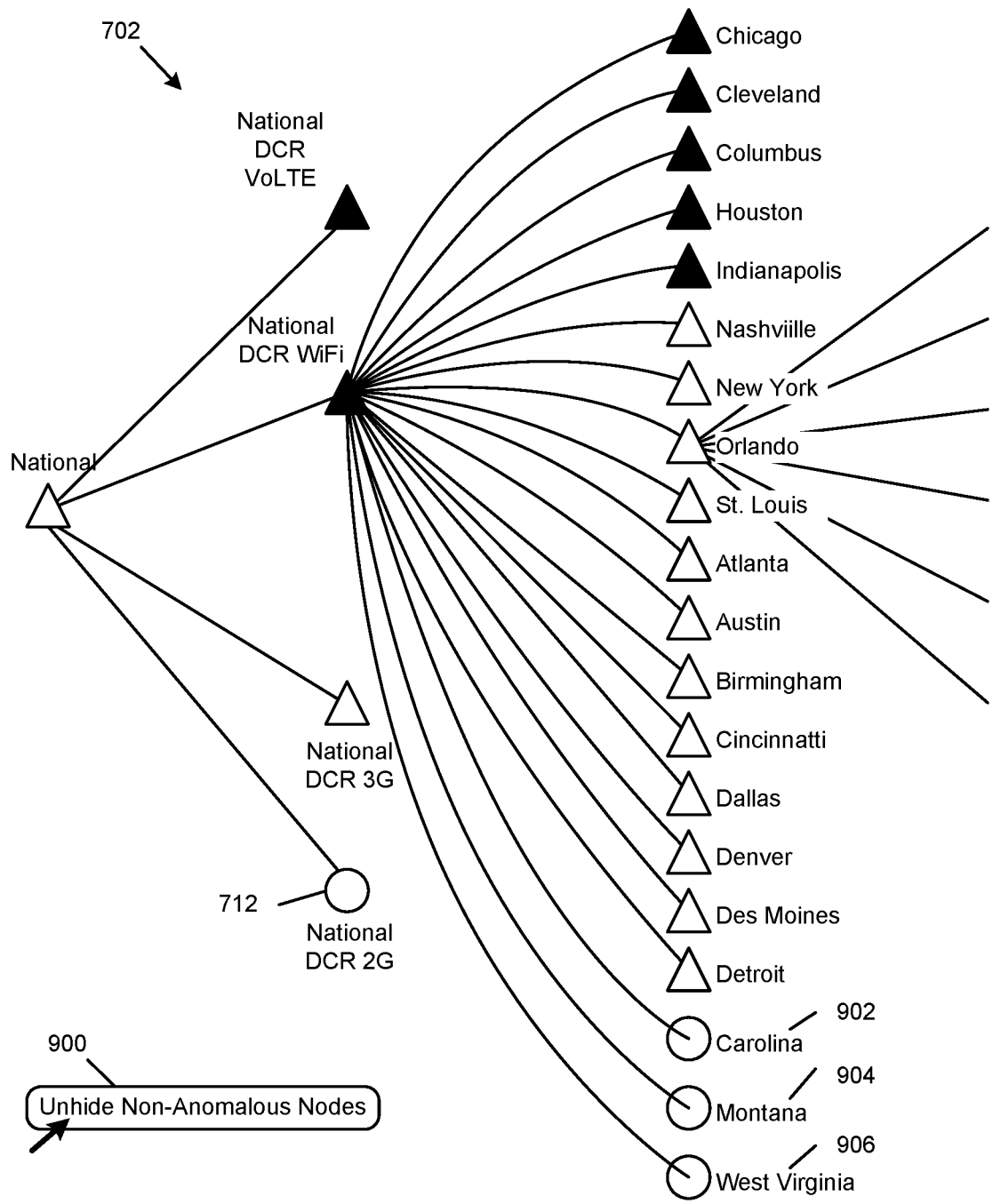
FIG. 9 illustrates unhiding of nodes that correspond to observed entities that do not have detected anomalies.

FIG. 9 illustrates unhiding of nodes that correspond to observed entities that do not have detected anomalies. As illustrated, the GUI 700 includes an unhide element 900. When the unhide element 900 is selected, several nodes that were previously hidden become unhidden, including nodes 712, 902, 904, and 906. These nodes are illustrated as circular shaped to indicate that they correspond to observed entities that do not have detected anomalies. The user of the anomaly inspector 124 may unselect the GUI unhide element 900 to again hide these nodes.

III. Anomaly Analyzer

The anomaly detection and analysis system 100 includes an anomaly analyzer 126 that generates a real-time analysis or summary of the anomalies. The real-time analysis is made possible by the anomaly analyzer 126 automatically classifying the anomalies into different anomaly items and ranking the different anomaly items. (An anomaly item is a grouping of anomalies based on a set of common features.)

In some embodiments, the ranking is based on a scoring system that quantifies the severity or relevance of the anomalies using weighting and binary value conversion techniques to simplify and expedite ranking computation. In some embodiments, the ranking score of an anomaly item is computed based on the number of customers impacted by the anomalies of the item. In some embodiments, the ranking score of an anomaly item is computed based on different types of anomalies that are present in the anomaly item, with different types of anomalies being assigned different predefined weights. In some embodiments, different types of anomalies are assigned power of two numbered weights corresponding to different bit positions of a binary word, with the most severe anomaly type assigned the most significant bit position.

FIG. 10 illustrates ranking scores that quantify the severity or relevance of the anomalies using weighting and binary value conversion techniques. The figure illustrates example anomaly items 1001-1010. Each anomaly item is associated with a set of features, and the anomaly item represents anomalies that are detected from the KPI items (sets of KPI data) having the set of features. For example, the anomaly item 1001 corresponds to anomalies detected from market level KPI data that are collected from devices having device ID "7050" running software version "8" in Albuquerque region, while the anomaly item 1002 corresponds to anomalies detected from market level KPI data that are collected from devices having device ID "598" running software version "25" in Atlanta region.

In the example, each anomaly item may incorporate the following four types of anomalies: "VoLTE DCR", "WiFi DCR", "3G DCR", and "2G DCR". Some anomaly items, such as anomaly items 1003, 1006, and 1009 represent anomalies of all four anomaly types. Some anomaly items represent anomalies of only a subset of these anomaly types. For example, the anomaly item 1002 represent only anomalies of the type "VoLTE DCR" and "WiFi DCR". This indicates that anomalies detected from market level KPI data that are collected from devices having device ID "598" running software version "25" in Atlanta region do not have anomalies of the types "3G DCR" and "2G DCR".

In some embodiments, each anomaly item is assigned a score based on the types of anomalies that the anomaly item represent. In some embodiments, the different anomaly types are weighted differently when calculating the score of an anomaly item. In some embodiments, the weight assigned to each anomaly type is predetermined to reflect the importance or severity of the anomaly type. In some embodiments, different anomaly types are assigned different binary bit positions, and the weight assigned to each anomaly type is based on the power of two number that corresponds to the bit position of the anomaly type.

FIG. 10 illustrates a binary position weighting scoring scheme 1012 for anomaly items based on binary positions of different anomaly types in a 4-bit number. Specifically, "VoLTE DCR" is assigned the most significant bit position (bit 3 or x8), "WiFi DCR" is assigned the second most significant bit position (bit 2 or x4), "3G DCR" is assigned the third most significant bit position (bit 1 or x2), and "2G DCR" is assigned the least significant bit position (bit 0 or x1). Thus, for example, if an anomaly item has only "WiFi DCR" anomaly type, its weighted score is binary value 0100, or decimal value 4. If an anomaly item has anomaly types in "VoLTE DCR", "3G DCR", and "2G DCR" (labeled "network DCR"), its weighted score is binary value 1011, or decimal value 11.

Figure 11:
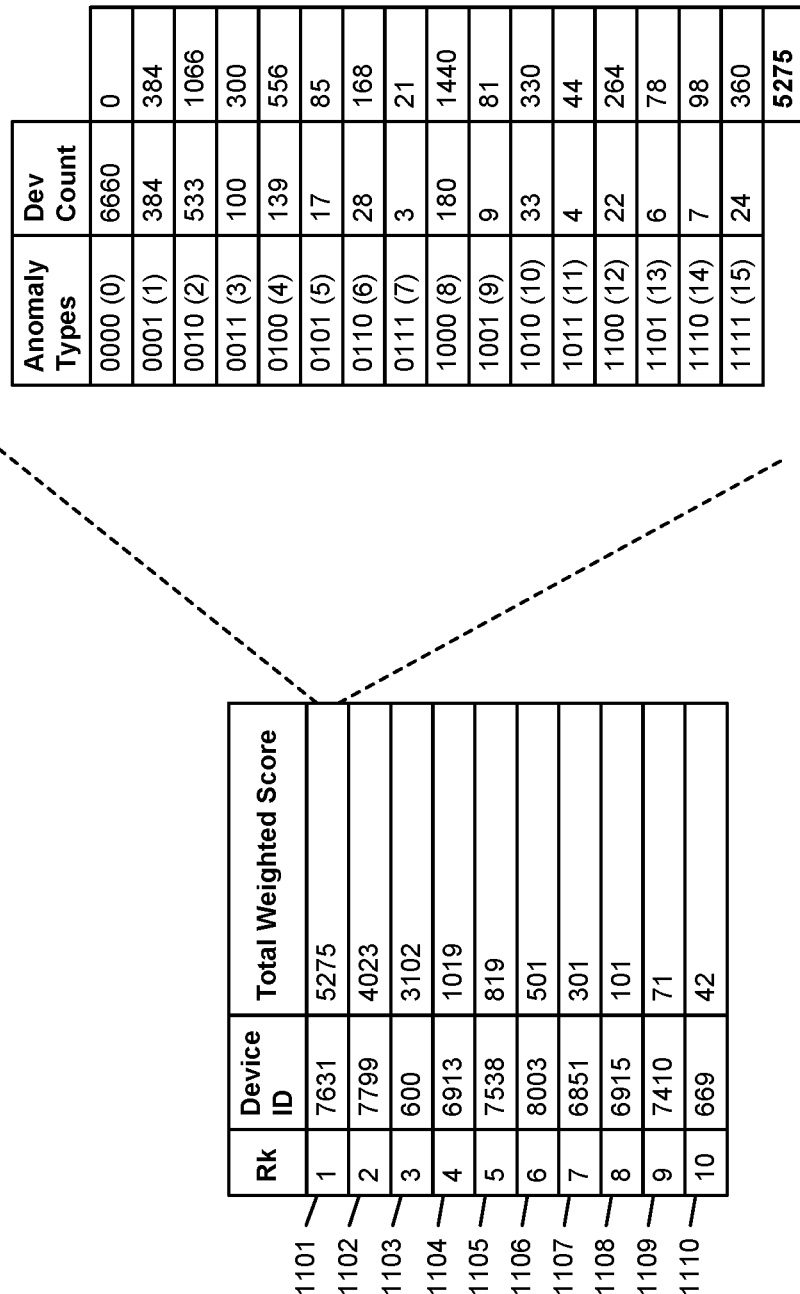
FIG. 11 illustrates anomaly items being ranked based on binary position weighting.

FIG. 11 illustrates anomaly items being ranked based on binary position weighting. The figure illustrates anomaly items 1101-1110. Each anomaly item represents anomalies that are detected from devices having a particular device ID or device type. For example, the anomaly item 1101 represents anomalies detected from KPI data of devices having device ID "7631", the anomaly item 1102 represents anomalies detected from KPI data of devices having device ID "7799", etc. The anomaly items 1101-1110 are ranked based on each anomaly item's weighted score, which is calculated based on binary position weighting.

For example, the weighted score of the anomaly item 1101 is "5275". This is calculated by summing the binary position weighted scores of all devices of the device ID "7631". This is the sum of the binary weighted scores of: 6660 devices having weighted score of 0 (no anomalies), 384 devices having weighted score of 1 (anomaly type 2G only), 533 devices having weighted score of 2 (anomaly type 3G only), 100 devices having weighted score of 3 (anomaly types 2G+3G), 139 devices having weighted score of 4 (anomaly type WiFi only), 17 devices having weighted score of 5 (anomaly types WiFi and 2G), etc. The weighted score of the anomaly item may also be calculated as a weighted sum of the device counts of each of the different anomaly types, each device count being weighted by its respective binary position.

In some embodiments, the ranking score of an anomaly item is computed based on the number of customers impacted by the anomalies of the item, without weighting different anomalies types differently. FIG. 12 illustrates the anomaly analyzer 126 ranking anomaly items based on the number of customers impacted. The figure illustrates anomaly items 1201-1212. Each anomaly item represents anomalies that are detected from the KPI items (sets of KPI data) having the set of features. For example, the anomaly item 1201 corresponds to anomalies detected from market level KPI data that are collected from devices having device ID "6562" running software version "9" in Austin, Miami, and New Jersey. Similarly, the anomaly item 1202 corresponds to anomalies detected from market level KPI data that are collected from devices having device ID "7018" running software version "18" in Chicago, etc.

The anomaly items 1201-1212 are sorted and ranked based on the number of devices impacted by the anomalies. Anomaly items with fewer affected customer devices are ranked lower than the anomaly item with more affected customers. For example, the number one ranked anomaly item 1201 represents anomalies of device ID "6562" that affect 6075 customer devices, the number two ranked anomaly item 1202 represents anomalies of device ID "7018" that affect 3795 customer devices. This type of ranking is also referred to as impact-based ranking.

FIG. 13 illustrates a GUI 1300 of the anomaly analyzer that facilitates the detection and analysis of anomalies based on continuously collected KPIs. The GUI 1300 may be provided by the user interface 118. The anomaly analyzer creates summaries of the anomalies and visually presents the summaries in the GUI 1300. The summaries of anomalies are ranked according to their ranking scores. The GUI 1300 also provides several GUI items for controlling the display of the anomaly summaries, including a date selection element 1302, a table selection element 1304, and an overall summary table 1306.

The date selection element 1302 allows the user to specify the KPI data of a particular date for analysis. The table selection element 1304 allows the user to select a type of summary table to be displayed in the GUI 1300. The overall summary table 1306 summarizes anomaly status for different technologies (VoLTE, 2G, WiFi, and 3G). In the example of FIG. 13, the table selection element 1304 may be used to select summary tables for "national overall DCR" (table 1308), "market level overall DCR" (table 1310), and "market network DCR" (table 1312).

The "national overall DCR" table 1308 is a summary that lists anomaly items for different device types at the national level. The "market overall DCR" table 1310 is a summary that lists market level anomaly items for different device types in different geographical locations. The "market network DCR" table 1312 shows anomaly items for different device types that span a network in multiple markets. Though the tables displayed by the GUI 1300 (tables 1308, 1310, and 1312) in FIG. 13 are summaries that ranks anomalies based on a number of devices impacted, the GUI 1300 may also be used to display summaries that rank anomalies based on binary position weighting.

Figure 14:
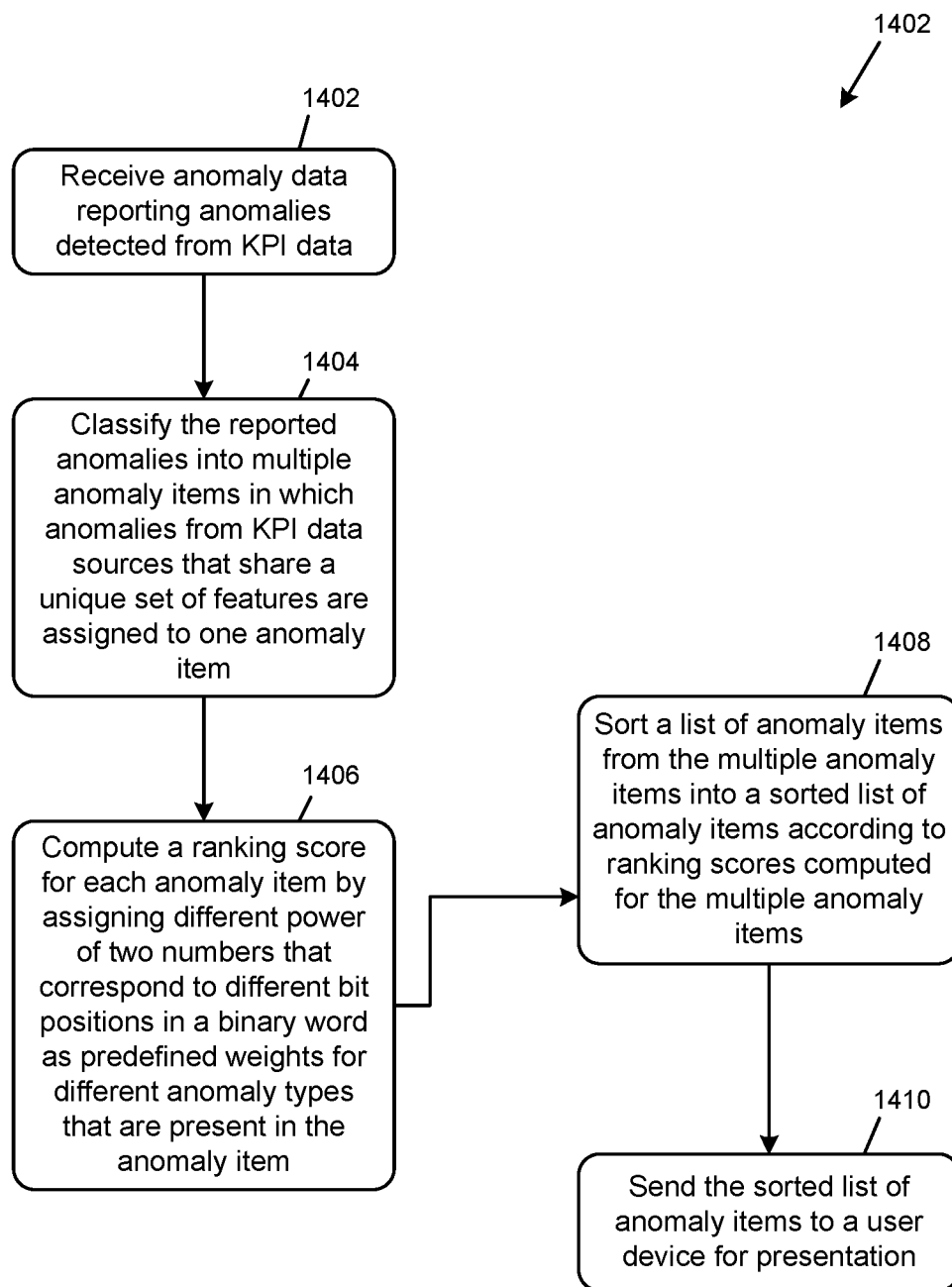
FIG. 14 conceptually illustrates a flow diagram of an example process for producing summaries of anomalies detected from KPI data.

FIG. 14 conceptually illustrates a flow diagram of an example process 1400 for producing summaries of anomalies detected from KPI data. In some embodiments, the process 1400 is performed by the anomaly analyzer 126 by the server device 102. The process 1400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 1402, the anomaly analyzer 126 receives anomaly data reporting anomalies detected from KPI data. In some embodiments, the anomaly data are generated by the anomaly detector 108 of the anomaly detection and analysis system 100, which stores in the KPI database 106 multiple sets of KPI data (or KPI items) from multiple sources. Each KPI item is associated with a set of features characterizing the KPI data (e.g., market or geographical location, vendor, technology, device types, software version, topic of the data being reported in the KPI, etc.). The anomaly detector 108 performs anomaly detection for each set of KPI data and stores the detected anomalies as anomaly data in the anomaly database 110.

At block 1404, the anomaly analyzer 126 classifies the reported anomalies into multiple anomaly items, wherein anomalies from KPI data sources that share a unique set of features are assigned to one anomaly item. For example, an anomaly item may represent anomalies detected from KPI data that are collected from a particular type of devices running a particular version of software in one or more geographical locations. In some embodiments, the anomaly analyzer 126 receives specifications for features sets that are used to classify anomalies into anomaly items from a user interface.

At block 1406, the anomaly analyzer 126 computes a ranking score for each anomaly item by assigning different power-of-two numbers that correspond to different bit positions in a binary word as predefined weights for different anomaly types that are present in the anomaly item. The different anomaly types may correspond to different mobile communications technologies (e.g., 2G, 3G, LTE, WiFi, 5G, etc.), such that each type of mobile communications technology may be assigned different weights based on their perceived importance.

At block 1408, the anomaly analyzer 126 sorts a list of anomaly items from the multiple anomaly items into a sorted list of anomaly items according to ranking scores computed for the anomaly items. At block 1410, the anomaly analyzer 126 sends the sorted list of anomaly items for presentation. The sorted list may be sent to the user interface 118 to be presented by a GUI (e.g., GUI 1300) as a summary table.

Though not illustrated in FIG. 14, in some embodiments, the anomaly analyzer 126 computes the ranking score of each anomaly item based on a number of the anomalies represented by the anomaly item. In some embodiments, the anomaly analyzer 126 computes the ranking score for each anomaly item based on a number of devices affected by the anomalies represented by the anomaly item.

Example Server Device

Figure 15:
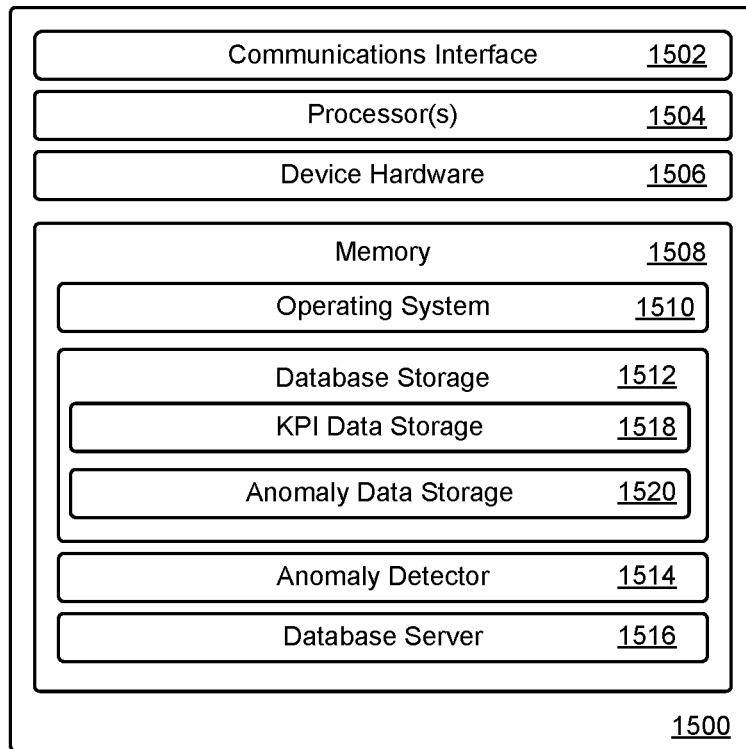
FIG. 15 is a block diagram showing various components of an example server device that process KPI data, perform anomaly detection, and expose content of a KPI database to web-based applications.

FIG. 15 is a block diagram showing various components of an example server device that process KPI data, perform anomaly detection, and expose content of a KPI database to web-based applications. The figure illustrates a computing device 1500 implementing the server device 102. The computing device 1500 may be a general-purpose computer, such as a desktop computer, tablet computer, laptop computer, server, or an electronic device that is capable of receiving inputs, processing the inputs, and generating output data. The computing device 1500 may also be a virtual computing device such as a virtual machine or a software container that is hosted in a cloud.

The computing device 1500 may be equipped with one or more of the following: a communications interface 1502, one or more processors 1504, device hardware 1506, and memory 1508. The communications interface 1502 may include wireless and/or wired communications components that enable the computing devices to transmit data to and receive data from other devices. The data may be relayed through a dedicated wired connection or via a communications network. The device hardware 1506 may include additional hardware that performs user interface, data display, data communication, data storage, and/or other server functions.

The memory 1508 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 1504 and the memory 1508 of the computing device 1500 may implement an operating system 1510, a database storage 1512, an anomaly detector 1514, and a database server 1516. The various software may include routines, program instructions, objects, and/or data structures that are executed by the processors 1504 to perform particular tasks or implement particular abstract data types.

The operating system 1510 may include components that enable the computing device 1500 to receive and transmit data via various interfaces (e.g., user controls, communications interface, and/or memory input/output devices), as well as to process data using the processors 1504 to generate output. The operating system 1510 may include a presentation component that presents the output (e.g., display the data on an electronic display, store the data in memory, transmit the data to another electronic device, etc.). The operating system 1510 may include a hypervisor that allows the computing device to operate one or more virtual machines and/or virtual network components. Additionally, the operating system 1510 may include other components that perform various additional functions generally associated with an operating system.

The database storage 1512 refers to memory storage allocated to implementing a database for storing KPI time series data and the result of anomaly detection (e.g., the KPI database 106 and the anomaly database 110.) As illustrated, the database storage 1512 includes KPI data storage 1518 and anomaly data storage 1520. The content of the KPI data storage 1518 is received from various data sources and normalized to time series format and stored in hive tables. The content of the anomaly data storage 1520 is received from the anomaly detector 1514 and stored as a NoSQL database. In some embodiments, the content of the anomaly data storage 1520 includes markings or labels that mark specific samples of the KPI data as being anomalous. The database server 1516 may retrieve the content of the database storage 1512 as part of a REST service.

The anomaly detector 1514 is a software component that performs anomaly detection (e.g., the anomaly detector 108.) The anomaly detector retrieves data from KPI data storage 1518 in time series format. The retrieved time series data is decomposed into trend, seasonality, and random components, which are in turn used to set anomaly detection boundaries ($B_{upper}$ and $B_{lower}$). The result of the anomaly detection operation is stored in the anomaly data storage 1520, which may include markings or labels that identify certain samples of KPI data as anomalous.

The database server 1516 is a software component that handles remote requests for content of the database storage 1512. In some embodiments, the database server 1516 is configured to communicate with client devices through RESTful APIs.

Example Client Device

Figure 16:
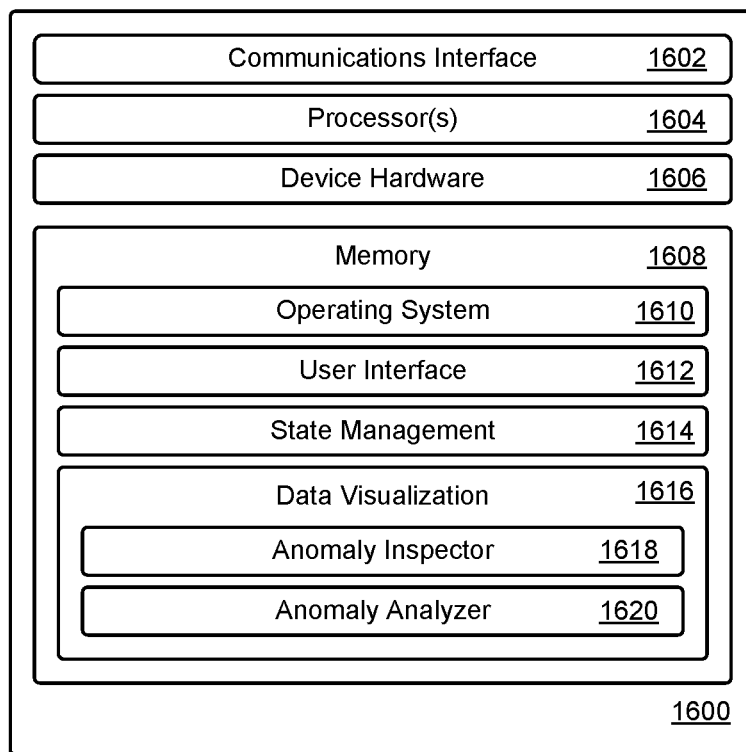
FIG. 16 is a block diagram showing various components of an example client device, consistent with an embodiment of the disclosure.

FIG. 16 is a block diagram showing various components of an example client device, consistent with an embodiment of the disclosure. The client device may operate a web-based application that communicates with the server device in order to provide analysis and visualization of the KPI data and detected anomalies. The figure illustrates a computing device 1600 implementing the client device 104. The computing device 1600 may be a general-purpose computer, such as a desktop computer, tablet computer, laptop computer, server, or an electronic device that is capable of receiving inputs, processing the inputs, and generating output data. The computing device 1600 may also be a virtual computing device such as a virtual machine or a software container that is hosted in a cloud.

The computing device 1600 may be equipped with one or more of the following: a communications interface 1602, one or more processors 1604, device hardware 1606, and memory 1608. The communications interface 1602 may include wireless and/or wired communication components that enable the computing devices to transmit data to and receive data from other devices. The data may be relayed through a dedicated wired connection or via a communications network. The device hardware 1606 may include additional hardware that performs user interface, data display, data communication, data storage, and/or other server functions.

The memory 1608 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device. In contrast, communication media may embody computer-readable instructions, data structures, program modules, or other data in a modulated data signal, such as a carrier wave, or other transmission mechanisms.

The processors 1604 and the memory 1608 of the computing device 1600 may implement an operating system 1610, a user interface 1612, a state management module 1614, and a data visualization module 1616, which includes an anomaly inspector 1618 and an anomaly analyzer 1620. The various modules may include routines, program instructions, objects, and/or data structures that are executed by the processors 1604 to perform particular tasks or implement particular abstract data types.

The operating system 1610 may include components that enable the computing devices 1600 to receive and transmit data via various interfaces (e.g., user controls, communications interface, and/or memory input/output devices), as well as process data using the processors 1604 to generate output. The operating system 1610 may include a presentation component that presents the output (e.g., display the data on an electronic display, store the data in memory, transmit the data to another electronic device, etc.). The operating system 1610 may include a hypervisor that allows the computing device to operate one or more virtual machines and/or virtual network components. Additionally, the operating system 1610 may include other components that perform various additional functions generally associated with an operating system.

The user interface 1612 performs remote request for content of the database storage 1512, namely KPI data and anomaly data. In some embodiments, the user interface 1612 operates a web-based application and communicates with the server device 102 through RESTful APIs. The user interface 1612 receives the KPI data and anomaly data from the database server 1516 and relays the received data to the anomaly inspector 1618 and the anomaly analyzer 1620 for analysis and visual presentation. In some embodiments, the user interface 1612 performs remote requests based on what is being visually presented by anomaly inspector 1618 and the anomaly analyzer 1620.

The state management module 1614 is a software component that manages state changes. In some embodiments, the state management module 1614 is implemented by Redux state container for JavaScript application. The state of the web application is represented by a single object, which is mutated by reducers functions.

The data visualization module 1616 is a software component that is responsible for providing visual presentations for both the anomaly inspector 1618 and the anomaly analyzer 1620, and to obtain user input for the anomaly inspector 1618 and the anomaly analyzer 1620. In some embodiments, the data visualization module operates a GUI.

The anomaly inspector 1618 is a software component that provides visualization of anomalies (e.g., the anomaly inspector 124). The anomaly inspector facilitates visualization and analysis of the KPI data and the detected anomalies at various observed entities at various granular levels. These observed entities may correspond to different markets (or geographical locations), different user device software versions, different user device manufacturers, different user device types, etc. In some embodiments, the anomaly inspector constructs a hierarchical tree, whose nodes correspond to observed entities at different granular levels. Each node is associated with KPIs that are monitored for a corresponding observed entity.

The anomaly analyzer 1620 is a software component that generates a real-time analysis or summary of the anomalies (e.g., the anomaly analyzer 126). The anomaly analyzer automatically classifies the anomalies into different anomaly items and ranking the different anomaly items. In some embodiments, the ranking is based on a scoring system that quantifies the severity or relevance of the anomalies using weighting and binary value conversion techniques to simplify and expedite ranking computation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a computing device storing computer-executable instructions that upon execution cause one or more processors to perform acts comprising:
   receiving samples of a time series data that includes a first sample group received during a first time interval and a second sample group received during a second time interval that is after the first time interval;
   decomposing samples of the first sample group into a trend component, a seasonality component, and a randomness component;
   identifying an upper bound and a lower bound based on the trend component, the seasonality component, and a variance of the randomness component;
   reporting a sample received after the first time interval as an anomaly when the sample exceeds the upper bound or the lower bound;
   comparing samples in the second sample group received during the second time interval to the upper bound and the lower bound;
   based on comparing the samples in the second sample group to the upper bound and the lower bound, determining that a portion of the samples in the second sample group are anomalous;
   based on a number of the samples in the second sample group and a number of the portion of the samples in the second sample group, determining a percentage of the samples in the second sample group that are anomalous;
   comparing the percentage of the samples in the second sample group that are anomalous to a threshold percentage;
   based on comparing the percentage of the samples in the second sample group that are anomalous to the threshold percentage, determining that the percentage of the samples in the second sample group that are anomalous satisfies the threshold percentage; and
   based on determining that the percentage of the samples in the second sample group that are anomalous satisfies the threshold percentage, recalculating the trend component, the seasonality component, and the randomness component using the samples in the second sample group received during the second time interval and without using the samples of the first sample group.

2. The one or more non-transitory computer-readable media of claim 1, wherein the threshold percentage is 80%.

3. The one or more non-transitory computer-readable media of claim 1, wherein the acts further comprise:
receiving an annotation of a particular sample that exceeds the upper bound or the lower bound as not being an anomaly.

4. The one or more non-transitory computer-readable media of claim 1, wherein the time series data is generated by a base station of a cellular network, a mobile device that subscribes to the cellular network, or a network element of the cellular network.

5. The one or more non-transitory computer-readable media of claim 1, wherein decomposing samples of the first sample group into the trend component comprises performing polynomial regression of the samples of the first sample group.

6. The one or more non-transitory computer-readable media of claim 1, wherein the first time interval is at least 60 days and the second time interval is two weeks.

7. The one or more non-transitory computer-readable media of claim 1, wherein the upper bound and the lower bound are defined based on ±2.5 standard deviation of the random component from a sum of the trend component and the seasonality component.

8. The one or more non-transitory computer-readable media of claim 1, wherein the acts further comprise:
constructing a hierarchical tree comprising a plurality of nodes that correspond to a plurality of observed entities at different granular levels;
selecting a portion of the hierarchical tree for anomaly analysis according to a predefined granularity setting, the portion of the hierarchical tree including a first node that corresponds to a first observed entity and a second node that corresponds to a second observed entity that is a sub-entity of the first observed entity;
retrieving KPI data associated with the first observed entity and the second observed entity as included in the selected portion of the hierarchical tree from a KPI database for the anomaly analysis, wherein the KPI data associated with the first observed entity comprises the time series data;
generating data for displaying the portion of the hierarchical tree that shows the first node without the second node, wherein the first node is marked with a first indicator when an anomaly is detected at the first observed entity, marked with a second indicator when an anomaly is detected at the second observed entity, or marked with a third indicator when no anomaly is detected at the first observed entity or the second observed entity, wherein an anomaly detected at the first observed entity is a sample of the time series data that exceeds the identified upper bound or the lower bound; and
sending the data to a user device to display the portion of the hierarchical tree at the user device.

9. The one or more non-transitory computer-readable media of claim 8, wherein the acts further comprise:
when a selection of the first node is received, generating additional data for displaying (i) one or more offspring nodes of the first node, (ii) the KPI data and the detected anomalies of the first observed entity, or (iii) the upper bound and the lower bound that are used for detecting the anomalies of the KPI data of the first observed entity.

10. The one or more non-transitory computer-readable media of claim 8, wherein the granularity setting is configured to reduce computation overhead by eliminating a performance of the anomaly analysis for an entirety of the hierarchical tree.

11. A computing device comprising: one or more processors; and a non-transitory computer-readable medium storing a plurality of computer-executable components that are executable by the one or more processors to perform a plurality of actions, the plurality of actions comprising:
receiving samples of a time series data that includes a first sample group received during a first time interval and a second sample group received during a second time interval that is after the first time interval;
decomposing samples of the first sample group into a trend component, a seasonality component, and a randomness component;
identifying an upper bound and a lower bound based on the trend component, the seasonality component, and a variance of the randomness component;
reporting a sample received after the first time interval as an anomaly when the sample exceeds the upper bound or the lower bound;
comparing samples in the second sample group received during the second time interval to the upper bound and the lower bound;
based on comparing the samples in the second sample group to the upper bound and the lower bound, determining that a portion of the samples in the second sample group are anomalous;
based on a number of the samples in the second sample group and a number of the portion of the samples in the second sample group, determining a percentage of the samples in the second sample group that are anomalous;
comparing the percentage of the samples in the second sample group that are anomalous to a threshold percentage;
based on comparing the percentage of the samples the second sample group that are anomalous to the threshold percentage, determining that the percentage of the samples in the second sample group that are anomalous satisfies the threshold percentage; and
based on determining that the percentage of the samples in the second sample group that are anomalous satisfies the threshold percentage, recalculating the trend component, the seasonality component, and the randomness component using the samples in the second sample group received during the second time interval and without using the samples of the first sample group.

12. The computing device of claim 11, wherein the threshold percentage is 80%.

13. The computing device of claim 11, wherein the plurality of actions further comprises receiving an annotation of a particular sample that exceeds the upper bound or the lower bound as not being an anomaly.

14. The computing device of claim 11, wherein the time series data is generated by a base station of a cellular network, a mobile device that subscribes to the cellular network, or a network element of the cellular network.

15. The computing device of claim 11, wherein decomposing samples of the first sample group into the trend component comprises performing polynomial regression of the samples of the first sample group.

16. The computing device of claim 11, wherein the first time interval is at least 60 days and the second time interval is two weeks.

17. The computing device of claim 11, wherein the upper bound and the lower bound are defined based on ±2.5 standard deviation of the random component from a sum of the trend component and the seasonality component.

18. A computer-implemented method, comprising: receiving samples of a time series data that includes a first sample group received during a first time interval and a second sample group received during a second time interval that is after the first time interval;
- decomposing samples of the first sample group into a trend component, a seasonality component, and a randomness component;
- identifying an upper bound and a lower bound based on the trend component, the seasonality component, and a variance of the randomness component;
- reporting a sample received after the first time interval as an anomaly when the sample exceeds the upper bound or the lower bound;
- comparing samples in the second sample group received during the second time interval to the upper bound and the lower bound;
- based on comparing the samples in the second sample group to the upper bound and the lower bound, determining that a portion of the samples in the second sample group are anomalous;
- based on a number of the samples in the second sample group and a number of the portion of the samples in the second sample group, determining a percentage of the samples in the second sample group that are anomalous;
- comparing the percentage of the samples in the second sample group that are anomalous to a threshold percentage;
- based on comparing the percentage of the samples in the second sample group that are anomalous to the threshold percentage, determining that the percentage of the samples in the second sample group that are anomalous satisfies the threshold percentage; and
- based on determining that the percentage of the samples in the second sample group that are anomalous satisfies the threshold percentage, recalculating the trend component, the seasonality component, and the randomness component using the samples in the second sample group received during the second time interval and without using the samples of the first sample group.

19. The computer-implemented method of claim 18, wherein the threshold percentage is 80%.

20. The computer-implemented method of claim 18, further comprising receiving an annotation of a particular sample that exceeds the upper bound or the lower bound as not being an anomaly.

* * * * *